United States Patent [19]

Ukai et al.

[11] Patent Number: 5,223,961
[45] Date of Patent: Jun. 29, 1993

[54] ACTIVE LIQUID CRYSTAL DISPLAY PANEL HAVING A SHORT-CIRCUIT METAL LAYER AND WELDING METAL PADS FOR CHANGING THE DEFECT OF A DEFECTIVE PIXEL

[75] Inventors: Yasuhiro Ukai, Kobe; Tomihisa Sunata, Miki; Kazuya Hashimoto; Minori Otsuki, both of Kobe, all of Japan

[73] Assignee: Hosiden Corporation, Osaka, Japan

[21] Appl. No.: 964,046

[22] Filed: Oct. 21, 1992

[30] Foreign Application Priority Data

Oct. 29, 1991 [JP] Japan .................................. 3-281788

[51] Int. Cl.$^5$ .................................. G02F 1/13
[52] U.S. Cl. .................................. 359/59; 359/87
[58] Field of Search .................................. 359/58, 59, 87; 340/719, 784

[56] References Cited

U.S. PATENT DOCUMENTS 5,121,236 6/1992 Ukai et al. .................................. 359/59

FOREIGN PATENT DOCUMENTS 0381428 8/1990 European Pat. Off. .

OTHER PUBLICATIONS

Patent Abstracts of Japan, vol. 14, No. 439 (P1084) Jul. 27, 1990 (Fujitsu Ltd.)

*Primary Examiner*—William L. Sikes
*Assistant Examiner*—Huy K. Mai
*Attorney, Agent, or Firm*—Pollock, VandeSande and Priddy

[57] ABSTRACT

On the inside surface of one of a pair of opposed transparent substrates forming an active liquid crystal substrate there are formed first and second insulating layers. Between the insulating layers there are provided transparent pixel electrodes arranged in a matrix form and source lines corresponding to respective columns of the pixel electrodes. A short-circuit metal layer is formed on the substrate, the opposite ends of the metal layer underlying a marginal portion of each pixel electrode and the source line adjacent thereto, respectively, but separated therefrom by the first insulating layer. In these overlapping regions welding metal pads are formed on the pixel electrode and the source line. Other welding metal pads of a ductile metal are formed on the second insulating layer right above the first-mentioned welding metal pads, respectively. In the case of a white-defect pixel, laser beams are applied to the two overlapping regions to destroy the first and second insulating layers and fuse metals of three layers together, by which the pixel electrode of the defective pixel is short-circuited to the corresponding source line.

5 Claims, 4 Drawing Sheets

ACTIVE LIQUID CRYSTAL DISPLAY PANEL HAVING A SHORT-CIRCUIT METAL LAYER AND WELDING METAL PADS FOR CHANGING THE DEFECT OF A DEFECTIVE PIXEL

BACKGROUND OF THE INVENTION

The present invention relates to an active liquid crystal display panel and, more particularly, to an active liquid crystal display panel which has a construction that mitigates the severity of the defect of a defective pixel.

A description will be given first, with reference to FIGS. 1 and 2, of a prior art example of an active liquid crystal display panel. Reference numeral 11 denotes a transparent substrate, over which pixel electrodes 15 are arranged in a matrix form. Adjacent the pixel electrodes 15 there are formed on the transparent substrate 11 TFT's (this film transistors) 16 which serve as switching elements. Reference numeral 18 indicates gate lines each formed along one of rows of the pixel electrodes 15. Reference numeral 19 denotes source lines each formed along one of columns of the pixel electrodes 15. The TFT's 16 each have its gate connected to the corresponding gate line 18 and have its source connected to the corresponding source line 19. The drain of each TFT 16 is connected to the corresponding pixel electrode 15. Reference numeral 17 denotes a common electrode formed over the interior surface of a transparent substrate 12 disposed opposite the transparent substrate 11 with liquid crystal 14 sealed in the space defined therebetween. The gate lines 18 and the source lines 19 are both selectively driven and only that one of the TFT's 16 whose gate and source are both driven by the selectively driven gate and source lines conducts, applying a voltage to the pixel electrode 15 corresponding to the conducting TFT 16. As a result, the optical condition of the liquid crystal 14 between the energized pixel electrode 15 and the common electrode 17 varies.

In FIG. 3 there is shown in section one TFT 16 on the transparent substrate 11 and its vicinity in the case where the TFT 16 is a top gate type one. Over an area of the transparent substrate 11 corresponding to the position where to form the TFT 16 there is provided a light intercepting or shielding layer 21 as of chromium (Cr) or molybdenum (Mo), which is covered with a first insulating layer 22 deposited almost all over the inside surface of the substrate 11. On the top of the first insulating layer 22 there are provided the pixel electrodes 15 and the source lines 19 made of a transparent conductor such as ITO and a semiconductor layer 23 which bridges the gap between the pixel electrode 15 and the source line 16 to form the TFT 16. The pixel electrodes 15, the source line 19 and the semiconductor layer 23 are covered with a second insulating layer 24 of silicon nitride deposited as a gate insulating layer almost all over the inside surface of the substrate 11. On the top of the second insulating layer 24 a gate electrode 25 facing the semiconductor layer 23 and the gate line 18 connected to the electrode 25 are simultaneously formed of the same metal, for instance, aluminum (Al). The shielding layer 21 is provided to prevent that a photoelectric effect is produced by the incidence of light to the semiconductor layer 23.

The transparent substrates 11 and 12, which constitute the liquid crystal display panel, are covered over the entire areas of their outside surfaces with polarizing film 10a and 10b. For example, when the liquid crystal 14 is a 90-degree twisted nematic liquid crystal, the liquid crystal display panel provides a display in a normally white or black mode, depending on whether the directions of polarization of the polarizing films 10a and 10b are perpendicular or parallel to each other. In the case where the polarizing films 10a and 10b are deposited with their directions of polarization perpendicular to each other, light incident to the liquid crystal 14 through the one polarizing film is polarized through 90 degrees when no voltage is applied to the liquid crystal 14, and hence the light is permitted to pass through the other polarizing film. On the other hand, when a voltage is applied to the liquid crystal 14, the light incident thereto through the one polarizing film is not polarized, and hence is intercepted by the other polarizing film.

In the active liquid crystal display panel which operates in the normally white mode as mentioned above, the display state of every pixel corresponding to the pixel electrode supplied with a voltage is changed from light transmitting state to light intercepting state. If a pixel develops a defect by which no voltage is applied across the corresponding pixel electrode and the common electrode at all times, the pixel will become a white-defect pixel which is always light transparent. In a color liquid crystal display, in particular, the white detect is far more noticeable as compared with a block defect that inhibits the passage of light through the defective pixel, and hence the permissible number of white defects in the liquid crystal display panel is smaller than the permissible number of black defects. Accordingly, the yield rate of fabrication of normally white mode color liquid crystal display panels is inevitably low. Also in black and white liquid crystal display panels, it is required, according to the purpose of use, user's liking or the like, that the number of white and black defects be smaller than predetermined numbers for the normally white mode and the normally black mode, respectively. In this instance, the yield rate of fabrication of the liquid crystal display panels can be improved by changing the white defect to the black one in the normally white mode panel and the black defect to the white one in the normally black mode panel.

To alleviate or suppress the deterioration of the display quality caused by the white detect in such a normally white mode active liquid crystal display panel, there is proposed, in U.S. Pat. No. 5,121,236 issued after the priority date of this application, a technique of changing the white defect to a black one by shorting the pixel electrode of the defective pixel to the gate or source line and supplying it with a potential during the operation of the liquid crystal display panel. According to the U.S. patent, a short-circuit metal layer of, for example, chromium (Cr) or molybdenum (Mo) is provided on a transparent substrate over and an area where it underlaps adjacent or opposed marginal portions of the pixel electrode and the source line with the insulating layer sandwiched therebetween. Welding metal pads, which are also formed of chromium or molybdenum, are provided on those areas of the marginal portions of the pixel electrode and the source line at positions where they overlap the short-circuit metal layer. If the pixel is a white-defect pixel, then a laser beam is applied to the overlapping portions of its welding metal pads and short-circuit metal layer to fuse them and destroy those areas of the insulating layer underlying them, thereby forming a short circuit between the pixel electrode of the defective pixel and the source line through the welding metal pads and the short-circuit metal layer thus fused together. Once the defective pixel electrode is connected to the source line, the potential that is normally applied to the source line is provided also to the defective pixel electrode. As a result, the white-defect pixel becomes a black-defect pixel.

In the above-mentioned U.S. patent, since the welding metal pads and the short-circuit metal layer are formed of a material of a high melting point, such as chromium or molybdenum, it is necessary that the regions to be irradiated by the laser beam be heated to an appreciably high temperature enough to melt the metal pads and the short-circuit metal layer and destroy the insulating layer so that are fused together. This incurs the possibility that the metal pads and an insulating layer overlying them may sometimes peel off and gets turned up, producing a short circuit between them and the common electrode on the other of the pair of opposed substrates.

SUMMARY OF THE INVENTION

It is therefore an object of the present invention to provide an active liquid crystal display panel of a pixel structure which makes it possible to change a white detect in the normally white mode to a black defect or a black defect in the normally black mode to a white defect.

Another object of the present invention to provide an active liquid crystal display panel of a pixel structure which attains the above objective and, at the same time, effectively prevents the welding metal pads from readily peeling off.

The present invention is directed to an active liquid crystal display panel of the type wherein a plurality of source lines and a plurality of gate lines are provided across each other over the inside surface of a first transparent substrate facing a second one with liquid crystal sealed in the space defined therebetween, the second transparent substrate being deposited over substantially the entire area of its inside surface with a common electrode, pixel electrodes are each provided in an area defined by the intersecting source and gate lines, thin film transistors are each provided near one of the pixel electrodes, and each thin film transistor has its source and gate connected to the corresponding source and gate lines, respectively. The active liquid crystal display panel of the present invention includes: a first transparent insulating layer formed almost all over the first substrate between it and the pixel electrodes; a second transparent insulating layer formed almost all over the first substrate, covering the first insulating layer and the pixel electrodes; a short-circuit metal layer formed between the first substrate and the first insulating layer and underlapping, at its one and other end portions, a marginal portion of each pixel electrode and one portion of at least one of the source and gate lines adjacent the pixel electrode, respectively, but separated therefrom by the first insulating layer; first and second welding metal pads formed between the first and second insulating layer and overlapping the short-circuit metal layer at its one and other and portions but separated therefrom by the first insulating layer; and third and fourth welding metal pads formed of a very ductile metal on the second insulating layer and overlapping the first and second welding metal pads, respectively.

DESCRIPTION OF THE PREFERRED EMBODIMENTS

Figure 1:
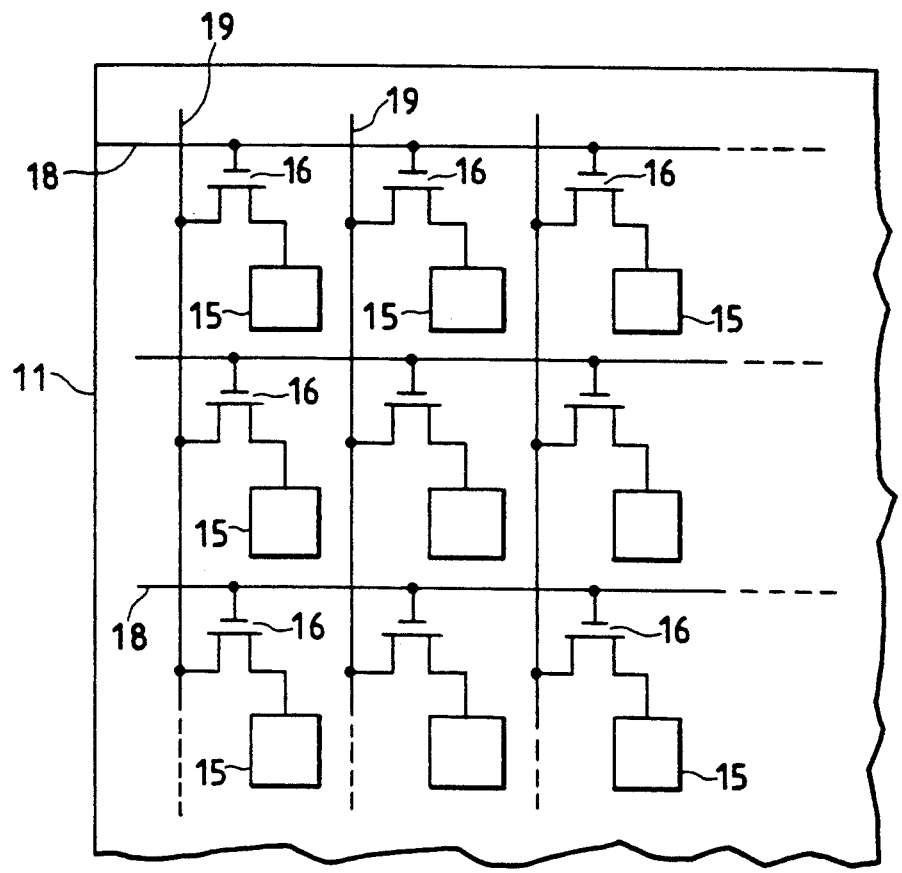
FIG. 1 is a diagram schematically showing a pixel matrix of a conventional active liquid crystal display panel.
Figure 2:
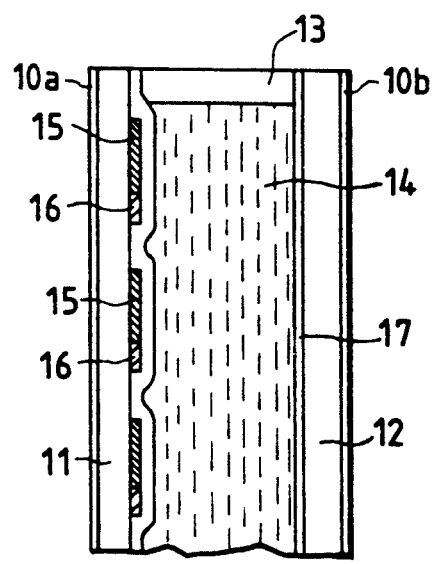
FIG. 2 is a sectional view of the conventional active liquid crystal display panel.
Figure 4:
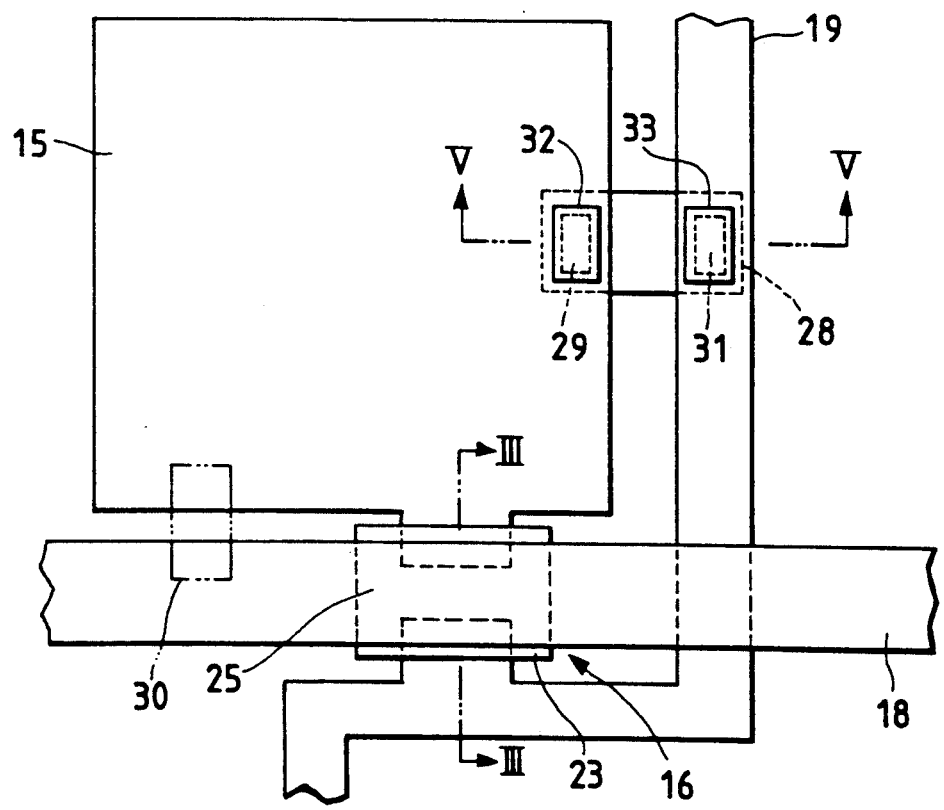
FIG. 4 is a plan view illustrating one pixel and the adjoining portion in the active liquid crystal display panel according to an embodiment of the present invention.
Figure 5:
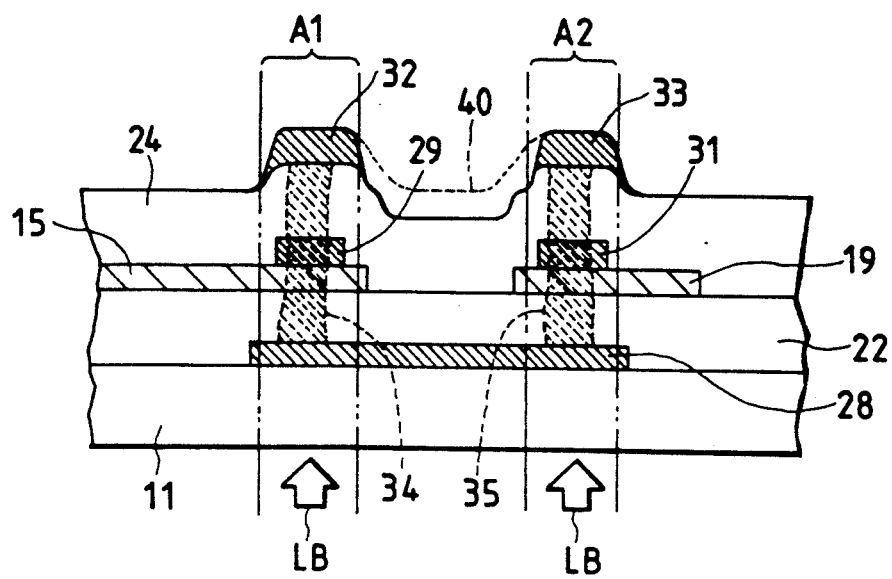
FIG. 5 is a sectional view taken on the line V—V in FIG. 4.

Referring to FIGS. 4 and 5, an embodiment of the present invention will be described. FIG. 5 is sectional view taken on the line V—V in FIG. 4. The liquid crystal display panel of this embodiment is generally identical in construction with the prior art example depicted in FIGS. 1 and 2, in which liquid crystal 11 is sealed in the space defined between transparent substrates 11 and 12 spaced apart in parallel, the substrate 11 has on its inside surface matrix-arranged transparent pixel electrodes 15, thin film transistors (TFT's) 16, gate lines 18 and source lines 19, and the substrate 12 has a transparent common electrode 17 deposited all over its inside surface. A description will be given of the pixel structure on the substrate 11 to which the present invention is directed, in particular. As shown in FIGS. 4 and 5, the transparent pixel electrodes 15 are arranged in a matrix form with their adjacent rows staggered by a half pitch. The pixel electrodes 15 are provided, together with the source lines 19, on the first insulating layer 22 deposited almost all over the inside surface of the substrate 11. The pixel electrodes 15 are each disposed in the area defined by the gate and source lines 18 and 19.

Figure 3:
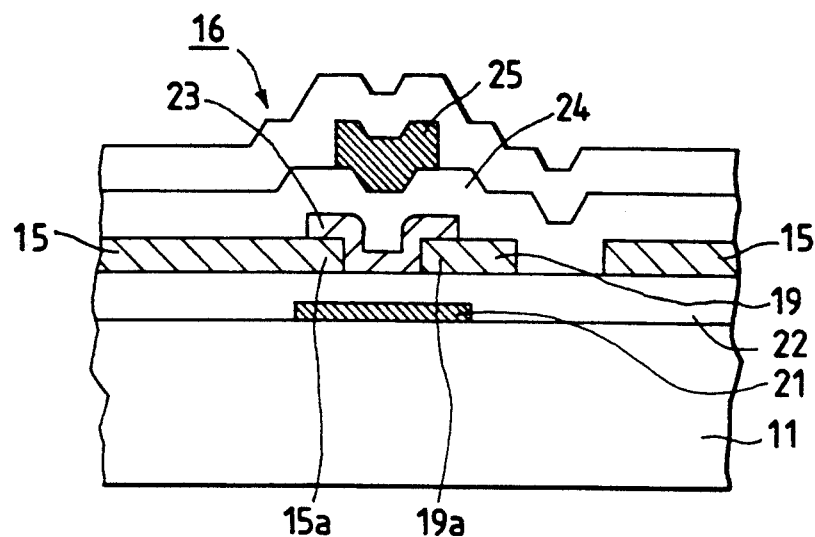
FIG. 3 is a sectional view showing a thin film transistor and the adjoining portion in the conventional active liquid crystal display panel.

The TFT's 16 are each provided on the first insulating layer 22 in the vicinity of one of the pixel electrodes 15. In this embodiment the TFT 16 is a top gate type thin film transistor and its sectional construction, indicated by III—III, is the same as shown in FIG. 3. A light shielding layer 21 as of chromium (Cr) or molybdenum (Mo) is interposed between the first insulating layer 22 and the substrate 11 in opposing relationship to the corresponding TFT 16. One marginal portion of each pixel electrode 15 and one marginal portion of each source line 19 are spaced apart but adjacent each other and a semiconductor layer 23 is provided which bridges the gap between them as in the case of FIG. 3. A second insulating layer 24 of silicon nitride, for example, is coated substantially all over the interior surface of the substrate 11, covering the pixel electrode 15, the source line 19 and the semiconductor layer 23. The second insulating layer 24 serves also as a gate insulating film of each TFT 16. On the second insulating layer 24 there is provided a gate electrode 25 opposite the semiconductor layer 23, together with the gate line 18. In this embodiment the gate line 18 is partly used as the gate electrode 25 and they are simultaneously formed of aluminum (Al), for example.

In each pixel there is formed between the first insulating layer 22 and the substrate 11 a short-circuit metal layer 28 which extends between the pixel electrode 15 and the source line 19 and underlie their opposed marginal portions, defining overlapping regions A1 and A2, though separated therefrom by the insulating layer 22. In this embodiment the short-circuit metal layer 28 is also made of chromium or molybdenum as is the case with the light shielding layer 21 and they are formed at the same time. In these overlapping regions A1 and A2 which are referred to as welding regions, there are formed welding metal pads 29 and 31 as of chromium or molybdenum on the marginal portions of the pixel electrode 15 and the source line 19 right above the metal layer 28, and further, there are formed on the second insulating layer 24 welding metal pads 32 and 33 of a highly ductile metal. The welding metal pads 32 and 33 may be formed simultaneously with the formation of the gate lines 18, using the same material, for example, aluminum.

In the liquid crystal display panel of the above-described pixel structure, when a certain pixel is a white-defect pixel, laser beams LB are applied to the welding regions A1 and A2 of the short-circuit metal layers 23 of the defective pixel from the outside of the substrate 11, destroying the first and second insulating layers 22 and 24 and fusing together the short-circuit metal layer 28 and the welding metal pads 29 and 32 in the first welding region A1 and the short-circuit metal layer 29 and the welding metal pads 31 and 33 in the second welding region A2. As the result of this, fused portions 34 and 35 are formed as indicated by the broken lines in FIG. 5, through which the pixel electrode 15 and the source line 19 are short-circuited. Since the welding metal pads 29 and 31 are held down by the welding metal pads 32 and 33 of high ductility on the second insulating layer 24, the metal pads 29, 31 and the second insulating layer 24 will not readily peel off by heat.

Figure 6:
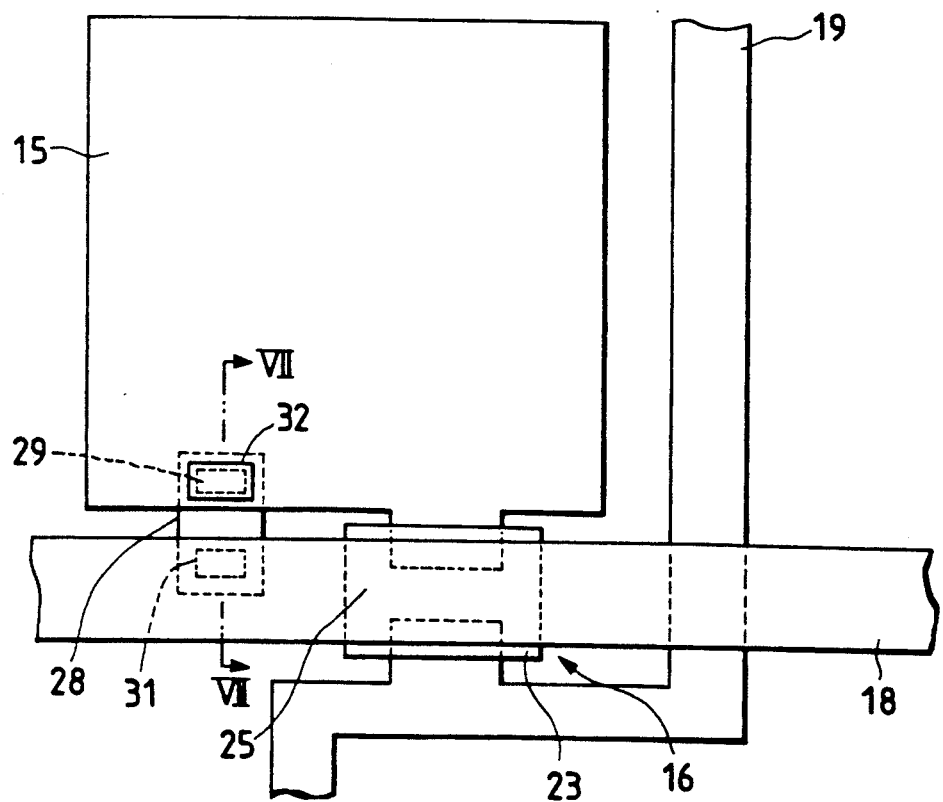
FIG. 6 is a plan view illustrating one pixel and the adjoining portion in another embodiment of the present invention.
Figure 7:
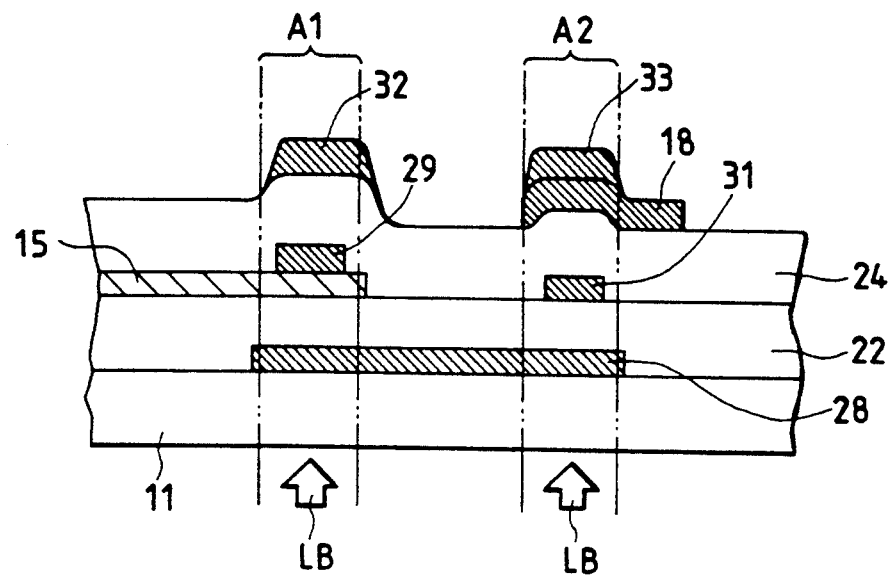
FIG. 7 is a sectional view taken of the line VII—VII in FIG. 6.

While the above embodiment of FIGS. 4 and 5 has been described to have the pixel structure in which the pixel electrode 15 of the white-defect pixel is short-circuited to the source line 19, it is also possible to utilize a construction in which the pixel electrode 15 is short-circuited to the gate line 18 at a position indicated by the broken line 30 in FIG. 3, for instance. An embodiment of such a structure is shown in FIG. 6 and FIG. 7 which is a sectional view taken on the line VII—VII in the former, the parts corresponding to those in FIGS. 4 and 5 being identified by the same reference numerals. Also in this embodiment the short-circuit metal layer 28 is provided between the first insulating layer 22 and the substrate 11 and one end portion of the metal layer 28 underlies the marginal portion of the pixel electrode 15 and is separated by therefrom by the first insulating layer 22, whereas the other end portion underlies the gate line 18 but is separated therefrom by the first insulating layer 22 and the second insulating layer (the gate insulating layer) 24. In the one welding region A1 the welding metal pad 29 is formed on the pixel electrode 15, but in the other welding region A2 the welding metal pad 31 is formed between the first and second insulating layers 21 and 24.

In these welding regions A1 and A2 the second insulating layer 24 is capped with the welding metal pads 32 and 33 formed of a very ductile metal, and when the gate line 18 is formed of, for instance, aluminum which is highly ductile, the metal pad 33 on the gate line 18 may be omitted, because a part of gate line 18 can be used also as the metal pad 33. In such an instance, the welding metal pad 32 can be formed simultaneously with the formation of the gate line 18, using the same material, for example, aluminum. In the case where an arbitrary pixel is a white-defect pixel in the liquid crystal display panel with the substrate 11 of such a pixel construction, the laser beams LB are applied to the welding regions of the short-circuit metal layer 28 of the defective pixel from the outside of the substrate 11 to short-circuit the pixel electrode 15 to the gate line 18, as in the case of FIG. 5.

While in the above the present invention has been described as being applied to the display panel which employs the top gate type thin film transistor as the TFT 16 of each pixel, it may also be substituted with a bottom gate type thin film transistor. In this case, the gate line 18 and the gate electrode 25 are provided between the substrate 11 and the first insulating layer 22 (not shown), but the pixel electrode 15 and the source line 19 are sandwiched between the first and second insulating layers 22 and 24 as in the case of FIG. 5, and the first insulating layer 22 can be used also as the gate insulating film of the TFT 16. Hence, the construction for short-circuiting the pixel electrode 15 to the source line 19 is exactly the same as in the case of FIG. 5. The short-circuit metal layer 28 can be formed simultaneously with the formation of the gate line 18, using the same material, for example, aluminum.

Figure 8:
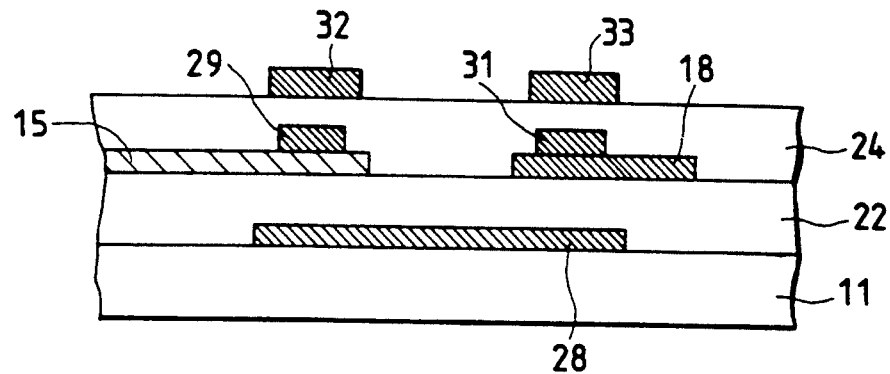
FIG. 8 is a sectional view, corresponding to FIG. 7, of still another embodiment of the present invention.
Figure 9:
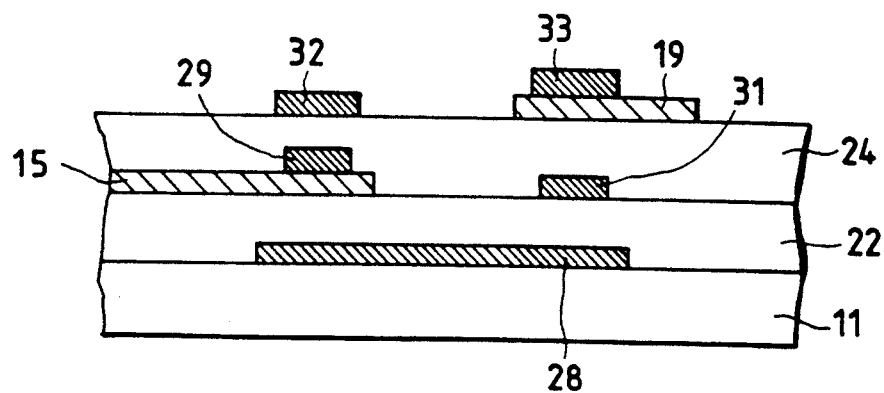
FIG. 9 is a sectional view, corresponding to FIG. 5, of a further embodiment of the present invention.

In the case of the pixel structure wherein the gate line 18 of the bottom gate type TFT 16 is formed in the same plane as the pixel electrode 15 and the latter is short-circuited to the former through the short-circuit metal layer 28, the welding metal pads 29 and 31 are provided on the marginal portion of the pixel electrode 15 and the gate line 18 and the welding metal pads 32 and 33 are provided on the second insulating layer 24 just above them as shown in FIG. 8. Alternatively, in the case of a pixel structure wherein the pixel electrode 15 is short-circuited to the source line 19 through the short-circuit metal layer 28, the welding metal pads 32 and 33 are deposited on the marginal portion of the pixel electrode 15 and the first insulating layer 22 and the welding metal pads 32 and 33 are provided on the second insulating layer 24 and the source line 19 right above the metal pads 29 and 31, respectively, as depicted in FIG. 9. When the source line 19 is formed of, for instance, aluminum which is excellent in ductility, the metal pad 33 on the source line 19 can be left out, since the source line 19 can be used also as the metal pad 33.

Although in the above the welding metal pads 32 and 33 on the second insulating layer 24 are described to be spaced apart, it is evident that they may be formed contiguous to each other, i.e. as one body, as indicated by the broken line 40 in FIG. 5. In this instance, since such a single pad 40 serves also as a short-circuit metal layer, the short-circuit metal layer 28 on the substrate 11 may also be divided into two, one in the welding region A1 and the other in the region A2.

As described above, the active liquid crystal display panel of the present invention has a pixel structure in which the welding metal pads 32 and 33 of high ductility are provided on the second insulating layer 24 right above the welding metal pads 29 and 31 of high-melting-point metal such as chromium or molybdenum, formed between the first and second insulating layers 22 and 24. With the provision of the welding metal pads 32 and 33, it is possible to prevent that the metal pads 29 and 31 and the insulating layer 24 overlying them peel off when laser beams are applied from the outside of the substrate 11 to fuse the short-circuit metal layer 28 and the welding metal pads 29 and 31 and destroy the first insulating layer 22 in order to electrically connect the pixel electrode 15 to the gate line 18 or source line 19. The formation of the ductile metal pads 32 and 33 can be carried out simultaneously with the formation of the gate line 18 or source line 19, using the same metal, for instance, aluminum. Hence, the formation of the metal pads 32 and 33 does not involve any particular steps in the manufacture of the liquid crystal display panel.

While the present invention has been described as being applied to the case where the pixel electrode of white defect in the normally white mode is changed to the pixel electrode of black defect, it is needless to say that the invention is also applicable to the case where the pixel electrode of black defect in the normally black mode is changed to the pixel electrode of white defect.

It will be apparent that many modifications and variations may be effected without departing from the scope of the novel concepts of the present invention.

What is claimed is:

1. An active liquid crystal display panel wherein a plurality of source lines and a plurality of gate lines are provided across each other over the inside surface of a first transparent substrate facing a second transparent substrate with liquid crystal sealed in the space defined therebetween, said second transparent substrate is deposited substantially all over its inside surface with a common electrode, pixel electrodes are each provided in one of areas defined by said intersecting source and gate lines to form a pixel, thin film transistors are each provided near one of said pixel electrodes, and said each thin film transistor has its source and gate connected to said source and gate lines corresponding thereto, respectively, said pixel comprising:

a first transparent insulating layer formed between said pixel electrodes and said first transparent substrate;

a second transparent insulating layer formed on the inside surface of said first transparent substrate, covering said first transparent insulating layer and said pixel electrode;

a short-circuit metal layer formed between said first substrate and said first insulating layer, one end portion of said short-circuit metal layer underlying a marginal portion of said each pixel electrode corresponding to said one thin film transistor in a first welding region but separated therefrom by at least said first insulating layer and the other end portion of said short-circuit metal layer underlying a part of at least one of said source and gate lines adjacent said each pixel electrode but separated therefrom by at least said first insulating layer in a second welding region;

first and second welding metal pads formed between said first and second insulating layers overlapping said short-circuit metal layer in said first and second welding regions but separated therefrom by at least said insulating layer; and third and fourth welding metal pads formed of a ductile metal on said second insulating layer right above said first and second welding metal pads in said first and second welding regions.

2. The active liquid crystal display panel of claim 1 wherein that one of said source lines corresponding to said each pixel is formed between said first and second insulating layers in said second welding region, and said first and second welding metal pads are formed on said marginal portion of said each pixel electrode and said corresponding source line, respectively.

3. The active liquid crystal display panel of claim 1 wherein said first welding metal pad is formed on said marginal portion of said each pixel electrode, and that one of said gate lines corresponding to said each pixel is formed on said second insulating layer in said second welding region and used also as said fourth welding metal pad.

4. The active liquid crystal display panel of claim 1 wherein that one of said gate lines corresponding to said each pixel is formed between said first and second insulating layers in said second welding region, and said first and second welding metal pads are formed on said marginal portion of said each pixel electrode and said corresponding gate line, respectively.

5. The active liquid crystal display panel of claim 1 wherein said first welding metal pad is formed on said marginal portion of said each pixel electrode, and that one of said source lines corresponding to said each pixel is formed on said second insulating layer in said second welding region and used also as said fourth welding metal pad.

* * * * *